US012053897B2

(12) United States Patent
Marut

(10) Patent No.: US 12,053,897 B2
(45) Date of Patent: Aug. 6, 2024

(54) LOCKING SWITCH FOR SHAVER HEAD

(71) Applicant: Brett Marut, Miami Beach, FL (US)

(72) Inventor: Brett Marut, Miami Beach, FL (US)

( * ) Notice: Subject to any disclaimer, the term of this patent is extended or adjusted under 35 U.S.C. 154(b) by 27 days.

(21) Appl. No.: 17/546,939

(22) Filed: Dec. 9, 2021

(65) Prior Publication Data

US 2023/0182334 A1 Jun. 15, 2023

(51) Int. Cl.
*B26B 21/40* (2006.01)

(52) U.S. Cl.
CPC ................................ *B26B 21/4037* (2013.01)

(58) Field of Classification Search
CPC .................................................. B26B 21/4037
See application file for complete search history.

(56) References Cited

U.S. PATENT DOCUMENTS 3,328,542 A * 6/1967 Andrews ................. B26B 19/38 200/547
3,365,796 A * 1/1968 Tolmie et al. ......... H02K 33/04 30/43.92
3,685,149 A * 8/1972 Bauman .................. B26B 19/02 30/346.51
3,999,291 A * 12/1976 Boer ....................... B26B 19/38 292/DIG. 72
4,125,940 A * 11/1978 Ihasz ....................... B26B 19/20 30/220
4,184,247 A * 1/1980 Poisson ................... B26B 21/30 30/59
4,233,733 A * 11/1980 Gallanis .................. B26B 19/10 30/43.92
2015/0089814 A1* 4/2015 Marut ................. B26B 19/3853 30/42
2015/0306777 A1* 10/2015 Georgakis ............. B26B 21/521 30/57
2017/0036363 A1* 2/2017 Efthimiadis .......... B26B 21/528
2020/0338768 A1* 10/2020 Dixon ................... B26B 21/523

* cited by examiner

*Primary Examiner* — Ghassem Alie
*Assistant Examiner* — Samuel A Davies
(74) *Attorney, Agent, or Firm* — Raymond Sun

(57) ABSTRACT

A shaver head has an upper housing having at least one blade secured thereto, a front mating engagement mechanism, and a rear engagement catch mechanism. The shaver head also has a lower housing having a front mating engagement mechanism, and a locking switch secured adjacent the rear edge of the lower housing, the locking switch having a button coupled to a catch which releasably engages the rear engagement catch mechanism.

3 Claims, 10 Drawing Sheets

LOCKING SWITCH FOR SHAVER HEAD

BACKGROUND OF THE INVENTION

1. Field of the Invention

The present invention relates to shavers, and in particular, to a locking switch for use with a shaver head.

2. Description of the Prior Art

Many different forms of electric shavers are in use today by men and women for grooming purposes. A popular type of men's grooming shaver is the backshaver which is designed and configured to allow the user to shave hair in the back. U.S. Design Pat. No. D700,997 illustrates such a backshaver which has a pivot handle that can be pivoted at a mid-section thereof to allow the user to adjust the angle for shaving purposes. Specifically, the pivot handle can have two sections that are connected at a pivoting connection. A shaver head is provided at the upper section of the pivot handle. Electronics and a power supply (e.g., a battery) can be housed inside the upper section and used to control the action of the shaver head.

While the backshavers have been very popular and effective in shaving back hair, one of the drawbacks experienced by such a backshaver is that the shaver blades can be dulled and require replacement. It would be expensive and undesirable to replace the entire backshaver, so it is desirable to provide a quick and effective means for replacing the blades in the shaver head.

SUMMARY OF THE DISCLOSURE

It is an object of the present invention to provide a shaver head that allows for dulled blades to be quickly and effectively replaced.

In order to accomplish the objects of the present invention, there is provided a shaver head having an upper housing having at least one blade secured thereto, a front mating engagement mechanism, and a rear engagement catch mechanism, and a lower housing having a front mating engagement mechanism, and a locking switch secured adjacent the rear edge of the lower housing, the locking switch having a button coupled to a catch which releasably engages the rear engagement catch mechanism.

To replace a dulled blade, the existing upper housing is removed and replaced with a new upper housing. The user presses the button to release the engagement between the catch and the rear engagement catch mechanism, then the front mating engagement mechanism of the upper housing is dis-engaged from the front mating engagement mechanism of the lower housing. A new upper housing is then taken and its front mating engagement mechanism is engaged with the front mating engagement mechanism of the lower housing, and then the rear engagement catch mechanism is pressed against the catch of the locking switch to cause the rear engagement catch mechanism to engage the catch of the locking switch.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 6:
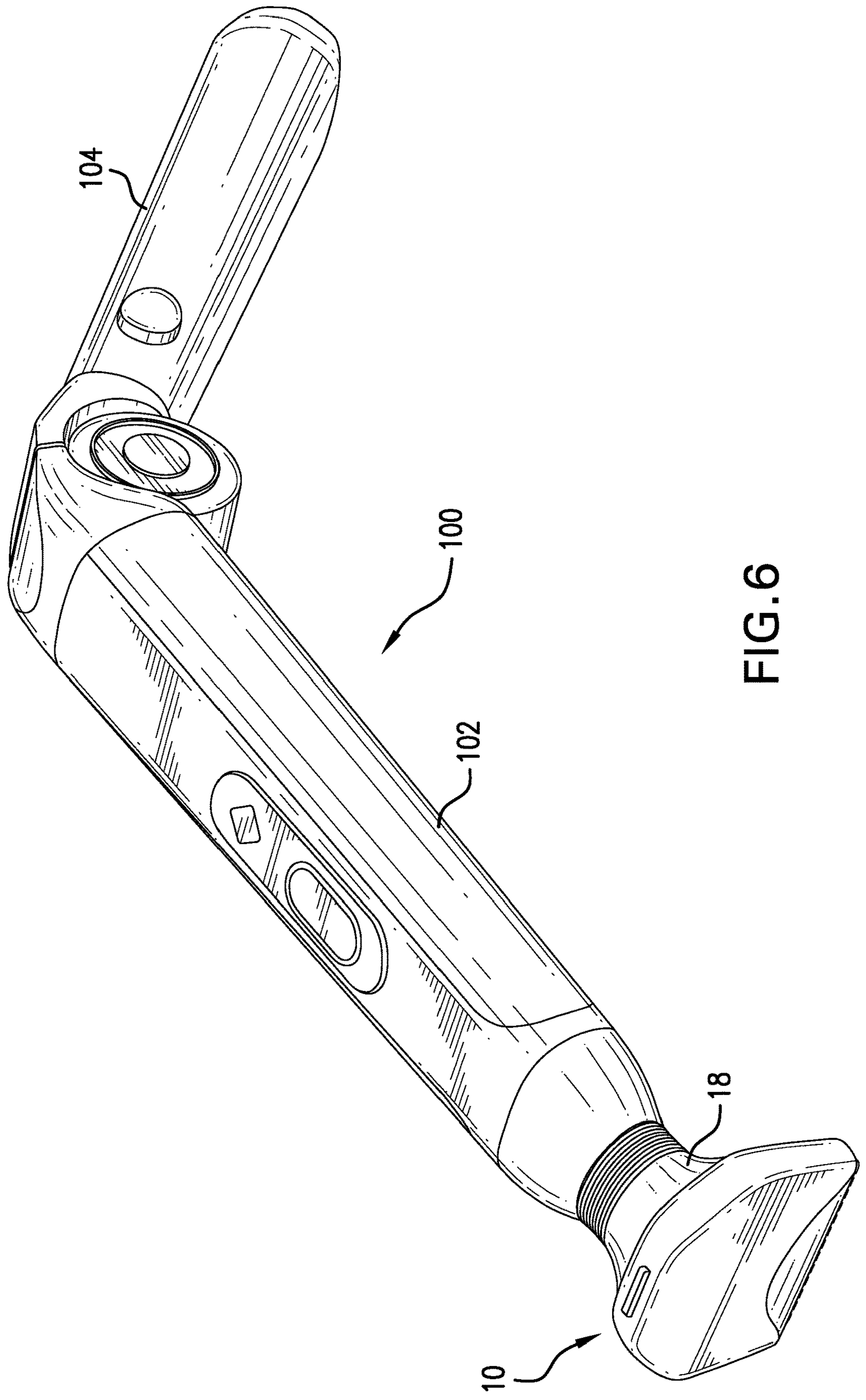
FIG. 6 is a perspective view of a backshaver that incorporates the shaver head of FIGS. 1A-1C.
Figure 7:
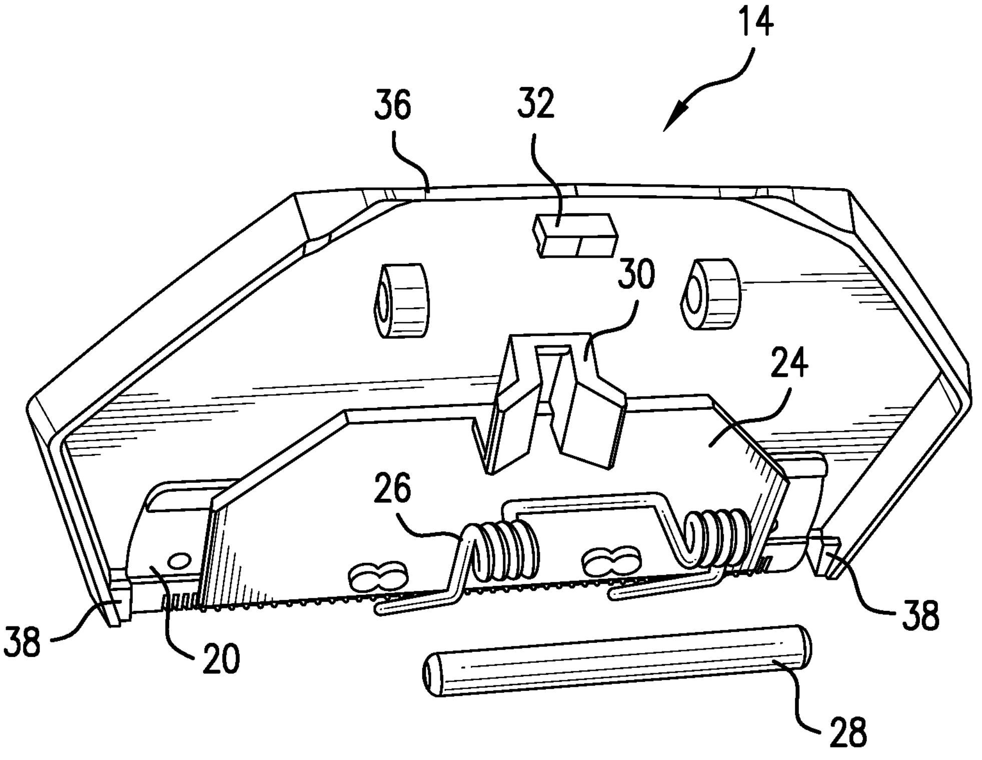
FIG. 7 is a bottom perspective view of an upper housing of the shaver head of FIG. 3.

The present invention provides a shaver head 10 that is adapted for use with a shaver, where the shaver head 10 is constructed and configured to allow for the convenient replacement of the blade(s) inside the shaver head 10. The shaver head 10 can be used any shaver, for example, can be used with the backshaver 100 shown in FIG. 6.

Figure 1A:
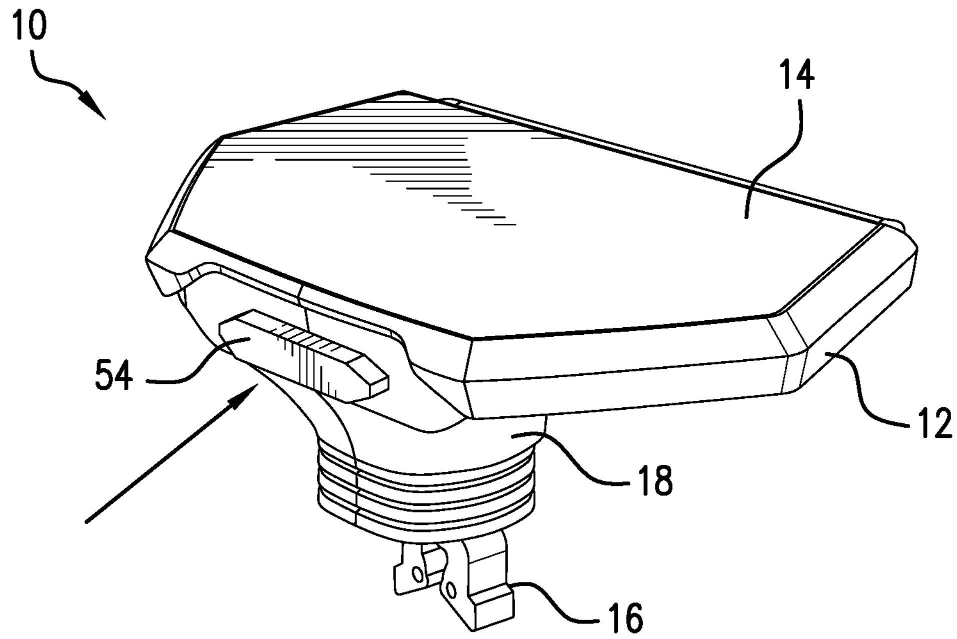
FIGS. 1A-1C illustrate how a shaver head according to one embodiment of the present invention is opened for blade replacement.
Figure 1B:
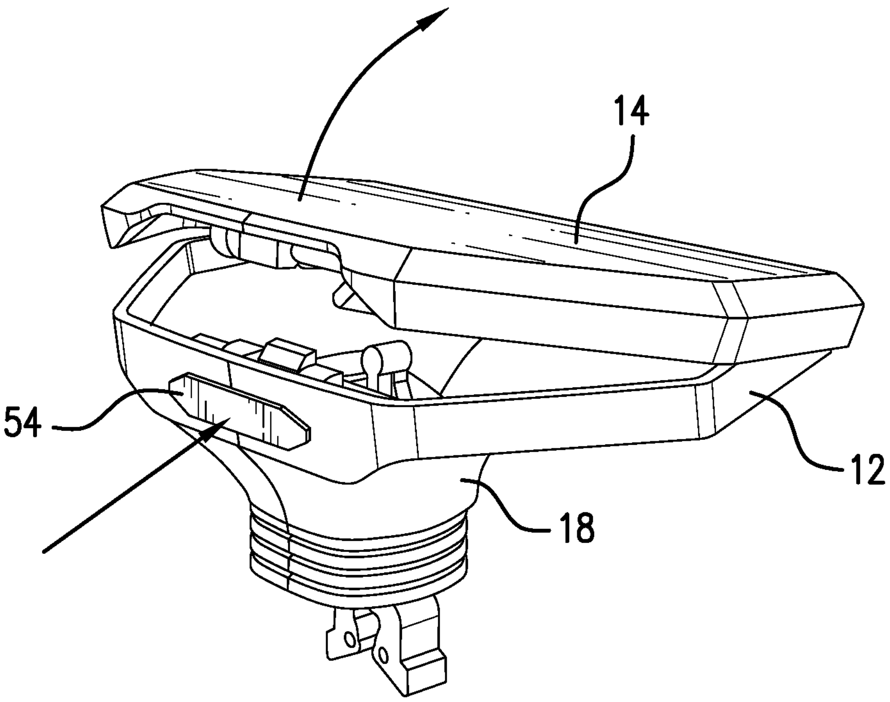
Figure 1C:
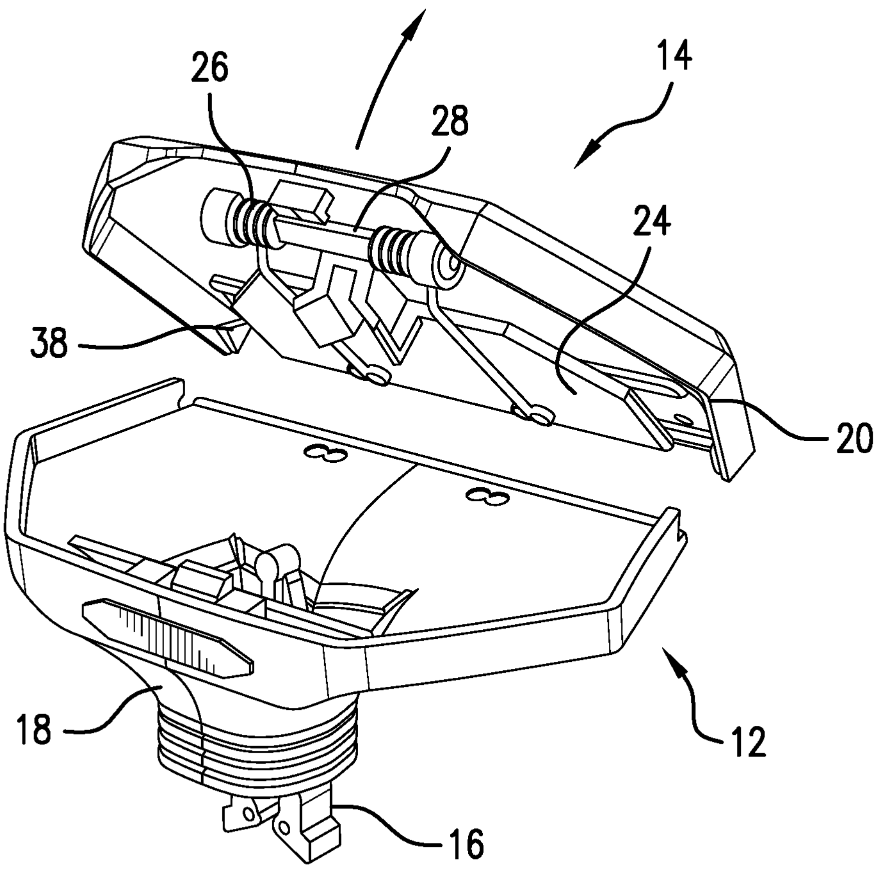

Referring to FIGS. 1A-1C, the shaver head 10 is made up of a lower housing 12 and an upper housing 14 that are removably attached to each other. The lower housing 12 has a neck section 18 that is secured to the upper section 102 of the backshaver 100. A lower section 104 is pivotably connected to the upper section 102 and serves as a handle for the user to grip when shaving.

Referring also to FIGS. 3-5 and 7, the upper housing 14 includes two blades 20 and 22 that are used to cut hair. The blade 22 is a movable blade, and the blade 20 is a stationary blade. A moving blade holder 24 holds the blades 20 and 22 against the upper housing 14, and a pressure spring 26 and a torsional spring balancing pole 28 function to position and maintain the blade holder 24 in place against the blades 20, 22 and the upper housing 14. A generally U-shaped rod holder 30 is provided at the middle of the blade holder 24 along a rear edge thereof. The structure and operation of the blades 20, 22 and how the blades 20, 22 operate to cut hair are well-known to those skilled in the art and will not be described in greater detail herein. A locking catch 32 is provided on the inner surface of the upper housing 14 adjacent the rear edge 36. The catch 32 has a catch leg 34 that has a beveled edge 33. Two hooks 38 are provided on the front edge of the upper housing 14 adjacent opposite ends of the blade 20.

Figure 3:
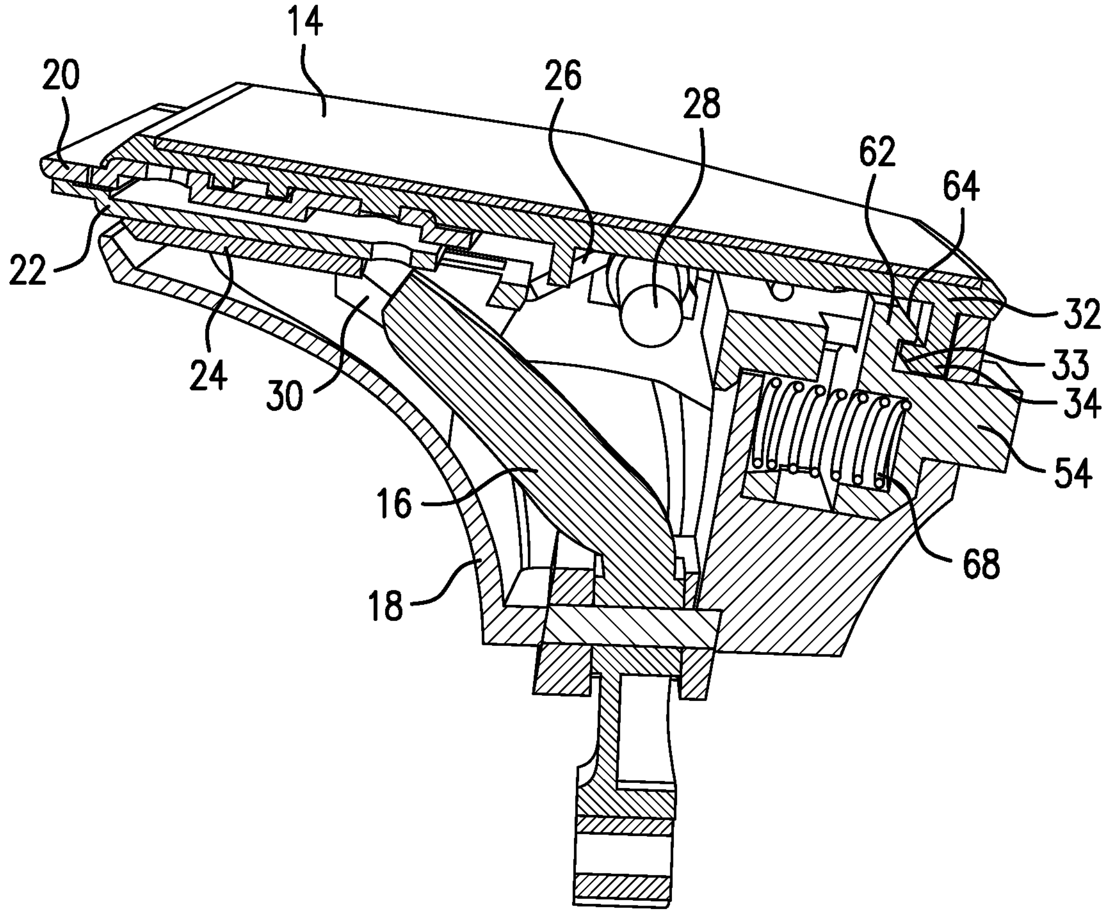
FIG. 3 is a cross-sectional view of the shaver head of FIGS. 1A-1C.
Figure 4:
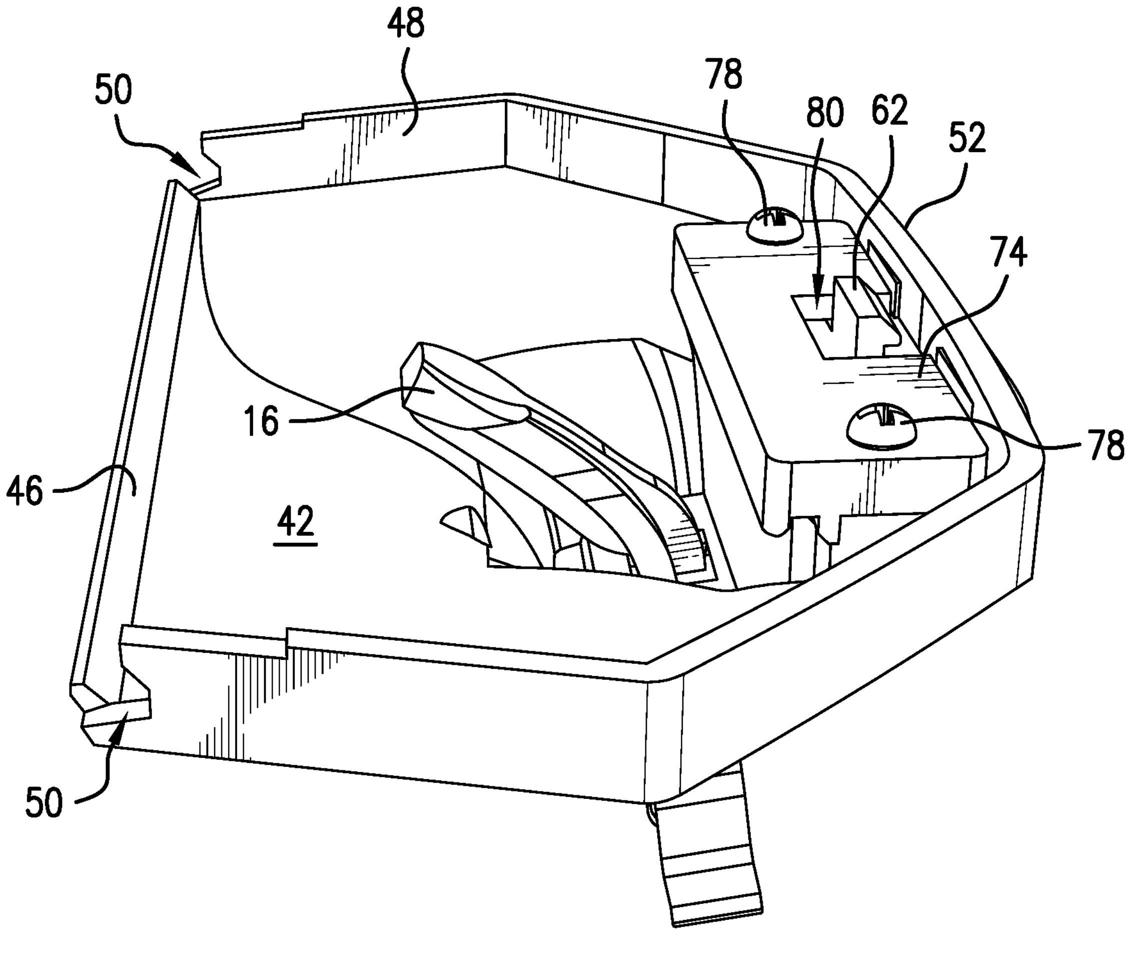
FIG. 4 is an upper perspective view of a lower housing of the shaver head of FIG. 3.
Figure 5:
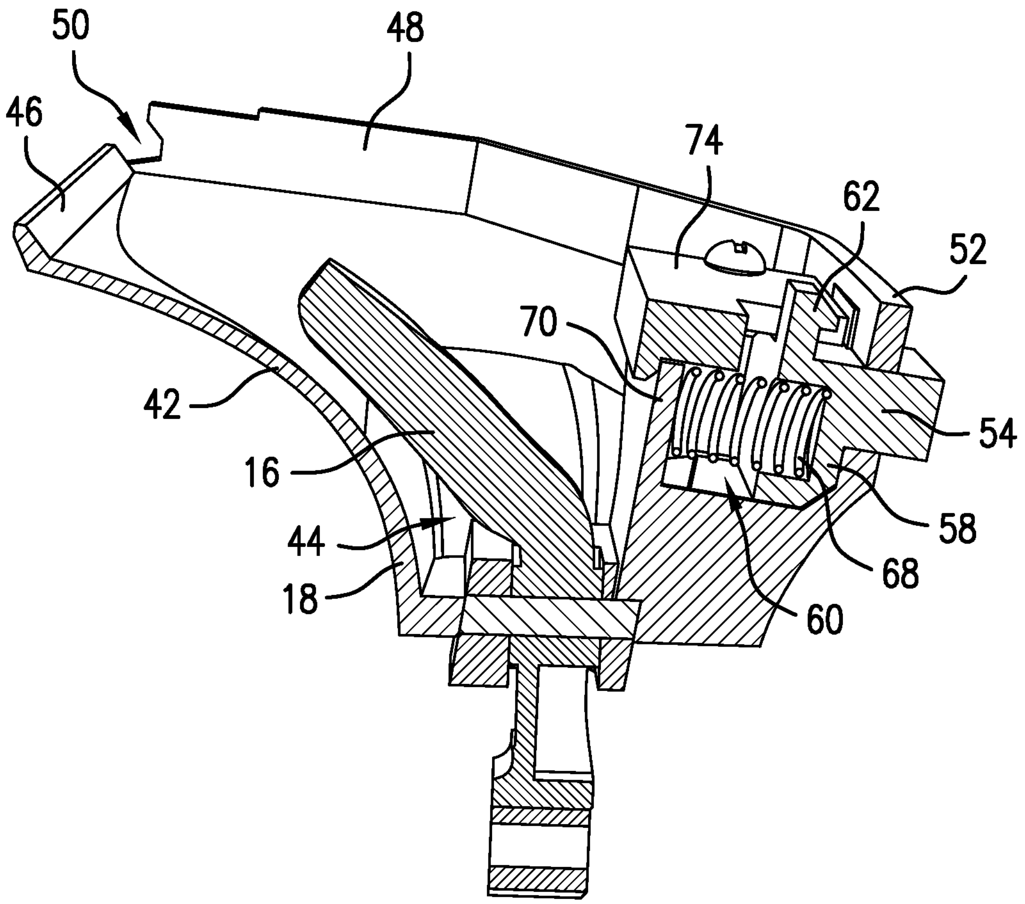
FIG. 5 is a cross-sectional view of the lower housing in FIG. 4.

Referring also to FIGS. 3-5, an oscillating rod 16 extends from the upper section 102 through the neck section 18 into the lower housing 12 to operably connect and control the cutting action of the blades 20 and 22. More specifically, the upper end of the oscillating rod 16 is received inside and operably coupled to the rod holder 30. The structure and operation of the oscillating rod 16 are well-known to those skilled in the art and will not be described in greater detail herein.

FIGS. 4 and 5 provide a more detailed illustration of the lower housing 12.

The lower housing 12 has a curved base wall 42, and a through opening 44 in the neck section 18 through which the oscillating rod 16 extends. The front edge of the lower housing 12 has a ramped edge 46. A side wall 48 extends in a U-shaped orientation with two opposite notched ends 50 positioned adjacent opposite ends of the ramped edge 46. The rear edge 52 of the lower housing 12 has an opening through which a button 54 of an automatic locking switch 56 extends.

Figure 8A:
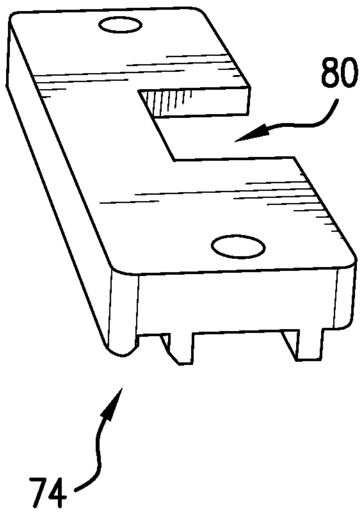
FIG. 8A is a perspective view of a securing plate for the lower housing of the shaver head of FIG. 3.
Figure 8B:
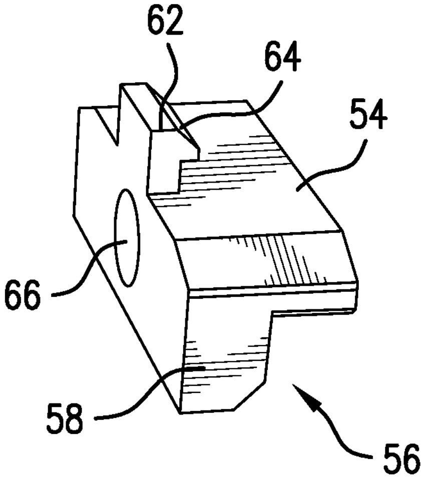
FIG. 8B is a perspective view of a locking switch.

The locking switch 56 is shown in FIG. 8B, and is a generally L-shaped block having a horizontal button 54 and a vertical body 58 that is seated in a receiving space 60 defined inside the lower housing 12 adjacent the rear edge 52. An L-shaped catch 62 extends upwardly from the horizontal button 54, and a beveled surface 64 is defined between the top and the side of the catch 62. A closed bore 66 is defined in the body 58 for receiving a spring 68 that extends into the receiving space 60 and is biased against a wall 70 that is used to define the receiving space 60.

FIG. 8A shows a securing plate 74 which is adapted to be positioned over the horizontal button 54 to secure the locking switch 56 inside the receiving space 60, with screws 78 functioning to secure the plate 74 in place inside the lower housing 12. The plate 74 has a front opening 80 that is adapted to allow the catch 62 to extend therethrough.

In operation, the upper housing 14 is secured to the lower housing 12 by a front engagement and a rear engagement. The front engagement involves a mating engagement with the hooks 38 on the upper housing 14 engaging the corresponding notches on the corresponding notched ends 50 of the lower housing 12. The rear engagement is accomplished by the hooked or catching engagement between the catch leg 34 of the locking catch 32 on the upper housing 14, and the catch 62 of the locking switch 56.

FIGS. 1A-1C and 2A-2C illustrate how a dulled blade 20 or 22 in the shaver head 10 is replaced. FIG. 1A illustrates the shaver head 10 in use, with the upper housing 14 and the lower housing 12 secured together. To replace a dulled blade 20 or 22, the entire upper housing 14 is replaced with a new upper housing 14, while the lower housing 12 can be retained and re-used. In the first step, the button 54 is pressed. As best shown in FIG. 3, pressing the button 54 pushes the spring 68 against its natural bias, and allows the catch leg 34 to be disengaged from the catch 62. This allows the rear end of the upper housing 14 to be disengaged, and lifted, from the rear end of the lower housing 12. See FIG. 2. The hooks 38 on the upper housing 14 can then be dis-engaged from the notches on the corresponding notched ends 50 of the lower housing 12. See FIG. 1C. The upper housing 14 can then be replaced.

Figure 2A:
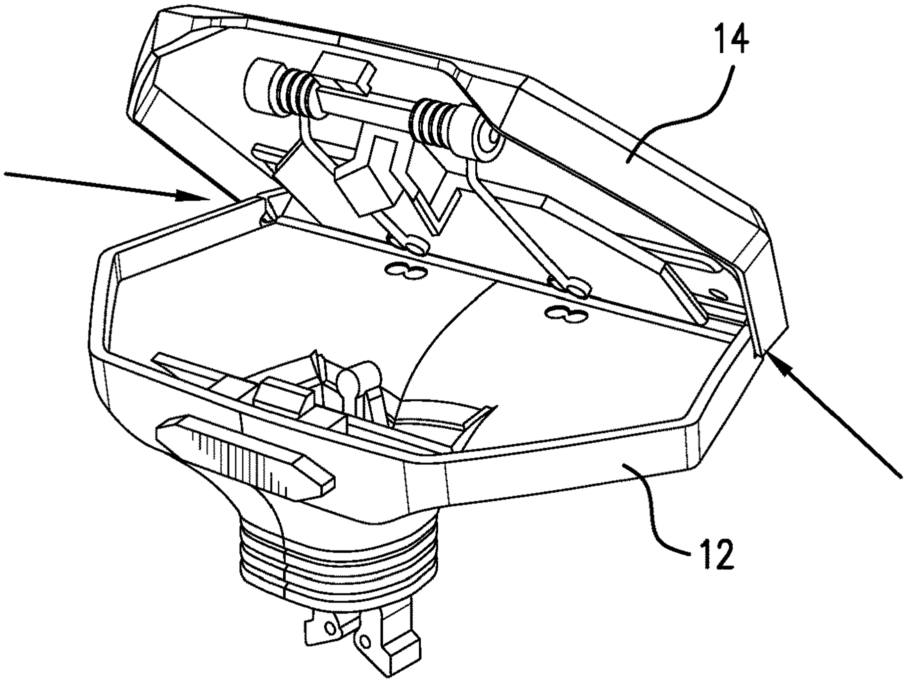
FIGS. 2A-2C illustrate how the shaver head of FIGS. 1A-1C is closed.
Figure 2B:
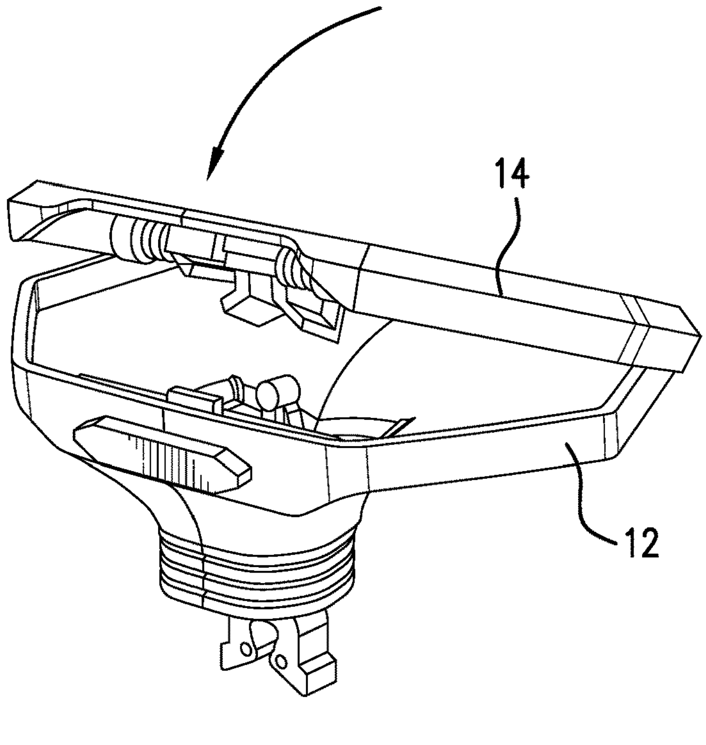
Figure 2C:
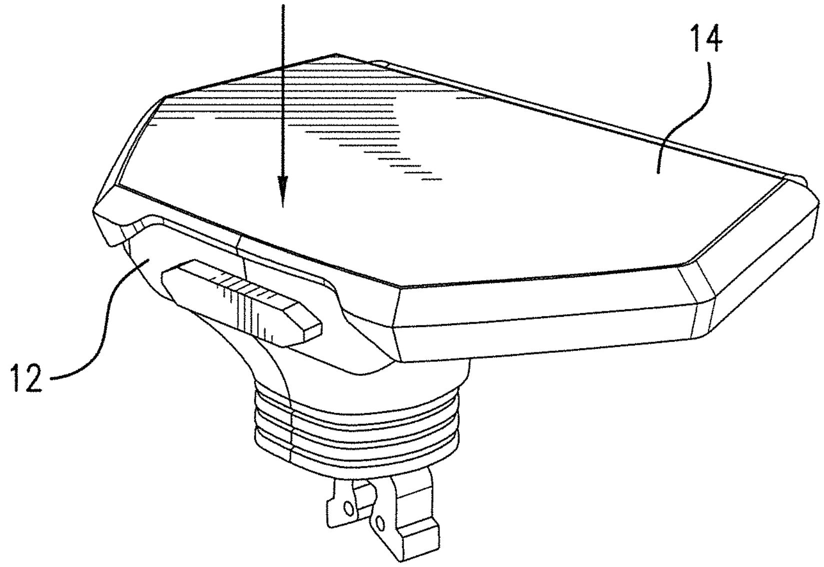

The new upper housing 14 having new blades 20 and 22 is shown in FIG. 2A, and the front end of the upper housing 14 can be secured to the front end of the lower housing 12 by engaging the hooks 38 on the upper housing 14 with the notches on the corresponding notched ends 50 of the lower housing 12, as shown in FIG. 2A. The rear end of the upper housing 14 is then pushed downwardly against the rear end of the lower housing 12. During this downward push, the beveled edge 33 pushed against the beveled surface 64 (see FIGS. 2B and 3) to push the button 54 against the natural bias of the spring 68 until the catch leg 34 of the locking catch 32 on the upper housing 14 engages the catch 62 of the locking switch 56. During this downward pushing action, the top end of the oscillating rod 16 is engaged inside the rod holder 30. FIG. 2C shows the resulting shaver 10 with the new upper housing 14 secured to the original lower housing 12. The shaver head 10 is now ready for use.

Thus, as illustrated in FIGS. 1A-1C and 2A-2C, the replacement of a dulled blade 20 or 22 is a very simple and convenient operation facilitated by the front engagement and the rear engagement of the upper housing 14 and the lower housing 12. A simple push of the button 54 allows the upper housing 14 to be quickly and conveniently removed, and a simple front-end hook-notch engagement coupled with a snap-fit engagement at the rear end quickly secures a new upper housing 14 in place.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A shaver head, comprising:

an upper housing having a front edge, a rear edge, an inner surface, and a locking catch provided on the inner surface at the rear edge, wherein the locking catch has a catch leg that has a beveled edge, the upper housing also having at least one blade secured to the upper housing adjacent the front edge;

a lower housing having a front edge having a portion thereof that removably engages a portion of the front edge of the upper housing, the lower housing further including an inner vertical wall and a rear edge which has an opening, wherein the inner vertical wall and the rear edge define a receiving space;

a locking switch having an L-shaped block having a horizontal button and a vertical body that is seated between the rear edge and the inner vertical wall, with the horizontal button extending through the opening, wherein an L-shaped catch extends upwardly from the horizontal button and has a beveled surface, wherein the vertical body has a closed bore; and a spring that extends in the receiving space and having a first end that is received inside the closed bore and a second end that is biased against the inner vertical wall;

wherein the catch leg of the locking catch on the upper housing engages the L-shaped catch of the locking switch to secure the upper housing and the lower housing together; and wherein the spring normally biases the L-shaped block towards the rear edge of the lower housing when the locking catch engages the L-shaped catch, and wherein pressing the upper housing adjacent the rear edge of the upper housing causes the beveled edge of the catch leg to slide downwardly along the beveled surface of the L-shaped catch to press the L-shaped block against the normal bias of the spring.

2. The shaver head of claim 1, further including a securing plate which is positioned over the horizontal button to secure the locking switch, the securing plate having a front opening through which the L-shaped catch extends into.

3. A method of replacing a dulled blade in a shaver head, comprising:

providing a shaver head having:

a first upper housing having a front edge, a rear edge, an inner surface, and a locking catch provided on the inner surface at the rear edge, wherein the locking catch has a catch leg that has a beveled edge, the upper housing also having at least one blade secured to the upper housing adjacent the front edge;

a lower housing having a front edge having a portion thereof that removably engages a portion of the front edge of the upper housing, the lower housing further including an inner vertical wall and a rear edge which has an opening, wherein the inner vertical wall and the rear edge define a receiving space;

a locking switch having an L-shaped block having a horizontal button and a vertical body that is seated in the receiving space, with the horizontal button extending through the opening, wherein an L-shaped catch extends upwardly from the horizontal button and has a beveled surface, wherein the vertical body has a closed bore; and a spring that extends in the receiving space and having a first end that is received inside the closed bore and a second end that is biased against the inner vertical wall;

wherein the catch leg of the locking catch on the first upper housing engages the L-shaped catch of the locking switch to secure the first upper housing and the lower housing together;

pressing the horizontal button to release the engagement between the locking catch and the L-shaped catch;

disengaging the front edge of the first upper housing from the front edge of the lower housing;

removing the first upper housing;

taking a second upper housing which is identical to the first upper housing; and engaging the front edge of the second upper housing with the front edge of the lower housing;

pressing the second upper housing adjacent the rear edge of the second upper housing to cause the beveled edge of the catch leg of the second upper housing to slide downwardly along the beveled surface of the L-shaped catch of the lower housing to press the L-shaped block of the lower housing against the natural bias of the spring; and engaging the catch leg of the locking catch on the second upper housing with the L-shaped catch of the locking switch of the lower housing to secure the second upper housing and the lower housing together.

* * * * *